(12) United States Patent  
Feinberg et al.

(10) Patent No.: US 8,133,520 B2
(45) Date of Patent: Mar. 13, 2012

(54) LOW OIL VOLUME FRYING DEVICE AND METHOD

(75) Inventors: Bruce G. Feinberg, Batavia, IL (US); Matthew P. Rollins, Hanover Park, IL (US); Sang Hoon Chun, Alpharetta, GA (US)

(73) Assignee: Restaurant Technology, Inc., Oak Brook, IL (US)

( * ) Notice: Subject to any disclaimer, the term of this patent is extended or adjusted under 35 U.S.C. 154(b) by 885 days.

(21) Appl. No.: 11/712,711

(22) Filed: Mar. 1, 2007

(65) Prior Publication Data

US 2008/0213448 A1    Sep. 4, 2008

(51) Int. Cl.
*A23L 1/01* (2006.01)
(52) U.S. Cl. ......... 426/438; 426/302; 426/417; 426/441
(58) Field of Classification Search .................. 426/438
See application file for complete search history.

(56) References Cited

U.S. PATENT DOCUMENTS

| | | | |
|---|---|---|---|
| 3,274,920 A * | 9/1966 | Benson | 99/404 |
| 3,933,645 A | 1/1976 | Keramida | |
| 3,968,741 A | 7/1976 | Hunt | |
| 4,029,804 A | 6/1977 | Clark et al. | |
| 4,230,574 A * | 10/1980 | Whaley et al. | 210/778 |
| 4,328,097 A | 5/1982 | Whaley et al. | |
| 4,487,691 A | 12/1984 | Panora | |
| 4,502,373 A | 3/1985 | Keating | |
| 4,602,612 A | 7/1986 | Schwizer | |
| 4,768,426 A | 9/1988 | Nett | |
| 4,942,808 A | 7/1990 | Benson et al. | |
| 4,945,893 A | 8/1990 | Manchester | |
| 5,247,876 A | 9/1993 | Wilson et al. | |
| 5,249,511 A | 10/1993 | Shumate et al. | |
| 5,253,567 A | 10/1993 | Gunawardena | |
| 5,330,638 A * | 7/1994 | Burklund et al. | 210/108 |
| 5,404,796 A | 4/1995 | Campbell et al. | |
| 5,586,486 A * | 12/1996 | Nitschke et al. | 99/330 |
| 5,782,164 A * | 7/1998 | Brintle | 99/330 |
| 6,041,802 A | 3/2000 | Nelson | |
| 6,235,210 B1 | 5/2001 | Saksena | |
| 6,305,274 B1 | 10/2001 | Nothum, Sr. et al. | |

(Continued)

OTHER PUBLICATIONS

Lelas et al.; Decreasing of oil absorption in potato strips during deep fat frying; Journal of Food Engineering; vol. 64, Issue 2, Sep. 2004, pp. 237-241; accepted Oct. 6, 2003; Available online Dec. 2, 2003.*
FSTC; Fryer Technology Assessment; 5011.02.26—May 2002.*
Askville: http://askville.amazon.com/long-re-used-deep-frying-oil/AnswerViewer.do?requestId=497778; published prior to Jan. 2006.*
Toma: Journal of Food Science; vol. 51, Issue 5; Sep. 1986.*

*Primary Examiner* — Patricia George
(74) *Attorney, Agent, or Firm* — Ryndak & Suri LLP

(57) ABSTRACT

A commercial device and method for cooking food product in cooking oil includes a fry vat containing an amount of cooking oil used to cook discrete batches of uncooked food in discrete batches of a weight relative to the amount of cooking oil in the range of from about 0.0375 to about 0.1, with the total amount of food being cooked at any one time relative to the amount of oil in the fry vat being about 0.1 or less. Cooking the food results in an uptake of oil by the food in an amount of from about 5.5% to about 13% by weight of the uncooked food, and an oil turnover ratio of from about 0.0026 to about 0.007 per discrete batch. Replacement oil is periodically added, and a sufficient number of batches are cooked over 60 hours of operation to achieve at least one vat oil turnover.

25 Claims, 5 Drawing Sheets

U.S. PATENT DOCUMENTS

| | | |
|---|---|---|
| 6,330,852 B1 | 12/2001 | Williams |
| 6,405,738 B1 | 6/2002 | Clark et al. |
| 6,455,085 B1 | 9/2002 | Duta |
| 6,890,428 B2 | 5/2005 | Mullaney, Jr. |
| 6,958,166 B2 | 10/2005 | Taylor |
| 7,100,497 B2 | 9/2006 | Shandross |
| 2002/0174776 A1 | 11/2002 | Nockermann et al. |
| 2003/0047084 A1 | 3/2003 | Shandross |
| 2003/0099754 A1 | 5/2003 | Sakai et al. |
| 2004/0107957 A1 | 6/2004 | Nishida et al. |
| 2005/0056157 A1 | 3/2005 | Savage et al. |

* cited by examiner

LOW OIL VOLUME FRYING DEVICE AND METHOD

FIELD OF THE INVENTION

The present invention relates to systems and methods for frying food that are suitable for restaurants and more particularly to devices and methods for optimizing product quality and cooking oil usage in commercial restaurant operations using fryer vats.

BACKGROUND OF THE INVENTION

Fryers are widely used in restaurants for cooking a variety of food products such as French fries, fried chicken, chicken nuggets, fried fish, and the like. A typical fryer includes one or more fryer vats containing cooking oil, each vat having a burner or heating element for heating the oil to cooking temperature. Typically, the vat is adapted to receive a fry basket containing food products so that the food products can be immersed in the hot oil and cooked, and then removed, drained of excess oil and served. During cooking, the food products absorb an amount of oil. The absorbed oil, or uptake oil, is compensated for by periodically adding replacement or make-up oil to the vat for cooking subsequent batches of food.

In the course of cooking food products by frying, the oil becomes contaminated with particulate food matter and other debris. Over time, the cooking process causes increased degradation of the oil due to increases in the amount of impurities that accumulate in the oil, such as for example, increased levels of free fatty acids and total polar compounds in the oil. Additionally, the cooking oil degrades over a period of time due to being subjected to an elevated cooking temperature. The oil may also absorb flavors and odors from the food products, especially when cooking a strongly-flavored food such as fish. When continuing to cook with degraded vat oil an undesirable off-flavor is imparted to the food products affecting the quality of the cooked food product. Most significantly, the taste and texture of the final food product drops below acceptable quality standards. Thus, for optimum food quality it is necessary to periodically replace the oil in the fryer vat with fresh oil. The combined cost of the replacement oil and the discarded oil for commercial restaurant frying operations can account for a significant percentage of total cost of the cooked food product. Another cost consideration regarding oil usage is that oil changes are labor intensive and thus constitute a time-consuming and expensive operation.

To extend the useful life of the cooking oil and reduce the need for oil changes, which are time-consuming and expensive, it is known to filter the particulate matter from the oil. A conventional approach is batch filtration, in which the cooking oil is drained from the vat and then manually filtered before being returned to the vat. After the vat is drained, it may also be wiped out manually to remove any debris that may have accumulated in the bottom of the vat. This method has several disadvantages. First, the vat must be taken out of service and then the vat must be completely drained. Once the oil has been filtered and returned to the vat, it then must be reheated to cooking temperature. This is time-consuming and inefficient and, as a practical matter, has meant that the oil can only be filtered after the end of the business day at the restaurant. Moreover, manually filtering the oil tends to be a messy and inconvenient task.

To address these disadvantages, semi-automatic filtration methods have been proposed. These methods eliminate manual filtering by providing an oil outlet through which used oil is directed from the vat to a filter and a pump or other means for returning filtered oil to the fryer vat. Typically, the number of batches of food products is counted, and when a predetermined number of batches is reached, the oil is filtered. However, depending on the type of food product being cooked, the temperature of the oil and other factors, the number of batches by itself may not provide an accurate indication of whether the oil needs to be filtered. As food is cooked in hot oil, the oil degrades due to increasing levels of free fatty acids and total polar compounds. Using only the batch count, the oil might for example be filtered only once a day if a relatively small number of batches were cooked that day, but other factors may adversely affect oil quality, so that if the oil is not filtered more often, food product quality may suffer. Also, as a practical matter, restaurant personnel may choose to perform semi-automatic filtering only at the end of the business day, which may also result in food product quality degradation between filter cycles.

A need therefore exists for an improved device and method for automatically filtering cooking oil in a fryer.

In addition, a need exists for a system and method for monitoring the elapsed time since the last filtration of cooking oil in a fryer in addition to the number of batches or quantity of food products cooked, and automatically filtering the oil based on the elapsed time since the last filtration and batch or quantity count.

A need also exists for reducing the amount of oil usage for frying food product to reduce oil usage costs and labor associated with conducting a vat oil change.

BRIEF SUMMARY OF THE INVENTION

In accordance with one aspect of the present invention, a commercial method of efficiently frying discrete batches of food includes providing a fry vat containing an amount of cooking oil and then separately and sequentially cooking discrete batches of uncooked food. The amount of food in each discrete batch on a weight basis relative to the amount of cooking oil is in the range of from about 0.0375 to about 0.1, while the total amount of food being cooked in the fry vat at any one time relative to the total amount of oil in the fry vat on a weight basis is less than or equal to about 0.1. The food being cooked in the cooking oil typically results in an uptake of oil by the food in an amount of from about 5.5% to about 13% by weight of the uncooked food with an oil turnover ratio of the oil in the fry vat of from about 0.0026 to about 0.007 per discrete batch on the basis of the weight of the oil uptake per batch to the amount of oil present in the fry vat. Each discrete batch is removed from the fry vat after cooking. Replacement oil is periodically added to the fry vat to replace the uptake oil of the food. A sufficient number of batches are cooked over an extended period of time without changing the oil while achieving an oil turnover equal to the amount of oil in the vat in less than about 60 hours of operation of the fry vat.

In accordance with another aspect of the present invention, the discrete batch size on a weight basis relative to the amount of cooking oil is about 0.05.

In another aspect of the invention the food cooked is French fries and the uptake of oil by the food is about 7% by weight of the food on a frozen uncooked basis.

In accordance with another aspect of the invention the oil turnover time is about 16 hours of operation of the fry vat.

In accordance with another aspect of the invention the oil is used for at least 112 hours of operation of the fry vat before the oil is discarded and replaced with fresh oil.

In accordance with another aspect of the invention, oil consumption is minimized. The amount of oil consumed per pound of food cooked is about 0.10 or less and in another embodiment is about 0.087 pounds of oil per pound of French fries cooked or less. Typically, this is accomplished while employing an oil turnover ratio of from about 0.0026 to about 0.007 while maintaining a high quality of the resulting cooked food products.

In accordance with another aspect of the invention the oil in the fry vat is periodically filtered.

In accordance with another aspect of the invention the replacement oil is added to the vat at a flow rate in the range of about 0.008 to about 0.08 gallons per minute of replacement oil per gallon of oil in the fry vat.

In accordance with still another aspect of the present invention, the method can further include periodically and frequently filtering the fry vat oil after frying a predetermined quantity of food and/or after a predetermined period of time after initiating cooking. Typically, frequent periodic filtration in accordance with the invention means filtering the fry oil promptly (typically without any further frying of additional batches of food in the fry vat) after frying an amount of food in the oil when the ratio of the amount of food fried to the amount of oil in the fry vat reaches about 0.7 (for example, after frying about 21 pounds of fried food using a fry vat with about 30 pounds of oil) and more preferably about 0.4 (for example, after frying about 12 pounds of food using a fry vat with about 30 pounds of oil) or less and most preferably about 0.33 or less. In addition, alternating the periodic filtration can occur after about 2 hours or less after the initial food products are cooked in the oil and more preferably after about 1 hour or less after the initial food products are cooked in the oil.

In accordance with another aspect of the invention, a commercial method of efficiently frying discrete batches of food is provided. The method includes providing a fry vat containing an amount of cooking oil, separately and sequentially cooking discrete batches of uncooked food, the amount of food in each discrete batch on a weight basis relative to the amount of cooking oil being in the range of from about 0.0375 to about 0.1, wherein the total amount of food being cooked in the fry vat at any time relative to the amount of oil in the fry vat being less than or equal to about 0.1, where the food being cooked in the cooking oil results in an uptake of oil by the food in an amount of from about 5.5% to about 13% by weight of the uncooked food and an oil turnover ratio of from about 0.0026 to about 0.007 per discrete batch; removing each discrete batch from the fry vat after cooking; and frequently periodically filtering the oil in the fry vat and returning the filtered oil to the fry vat.

In accordance with another aspect of the invention, the filtering occurs promptly after frying food in the fry oil wherein the ratio of the amount of food fried to the amount of oil in the fry vat is about 0.7 or less, more preferably about 0.4 or less and most preferably about 0.33 or less. The method may further include cooking a sufficient number of batches over an extended period of time without changing the oil to achieve an oil turnover equal to the amount of oil in the vat in less than about 60 hours of operation of the fry vat. In addition, the method may further include periodically adding replacement oil to the fry vat to replace the uptake oil of the food.

In accordance with another aspect of the present invention, an improved method for cooking food product in cooking oil is provided that includes monitoring the elapsed time since the last filtration of the cooking oil, monitoring the number of batches of food product cooked in the oil, and filtering the oil when a predetermined threshold value is reached based on the elapsed time since the last filtration and the number of batches cooked.

In accordance with still another aspect of the present invention, a prompt for a human operator is provided prior to filtering when the predetermined threshold is reached.

In another aspect of the invention, the oil is filtered based on an equation which defines the threshold as a function of the number of batches of food cooked and the elapsed time since the last filtration.

In accordance with another aspect of the invention, a method of treating cooking oil used in frying food products includes monitoring the elapsed time since the last filtration of the oil, monitoring the amount of food cooked in the oil, and filtering the cooking oil when a predetermined threshold value is reached based on the elapsed time since the last filtration and the amount of food products cooked in the oil.

In accordance with another aspect of the invention, a method of treating cooking oil used in frying food products includes monitoring the elapsed time since the last filtration of the oil, weighing the food products before cooking to monitor the amount of food cooked in the oil, and filtering the cooking oil when a predetermined threshold value is reached based on the elapsed time since the last filtration and the amount of food products cooked in the oil.

In accordance with another aspect of the invention, a system for filtering oil in a fryer includes a fryer vat, an oil outlet and an oil return inlet in the fryer vat, an oil filter, a valve for permitting the flow of oil from the outlet to the filter, a pump for returning oil from the filter to the fryer vat via the oil return inlet, means for monitoring the elapsed time since the last filtration of the cooking oil, means for monitoring the number of batches of food product cooked in the oil, and means for controlling the valve and pump to filter the oil when a predetermined threshold value is reached based on the elapsed time since the last filtration and the number of batches of food cooked.

In accordance with another aspect of the invention, the means for monitoring the elapsed time since the last filtration of the oil comprises a batch sensor and a computer.

In another aspect of the invention, the computer is programmed to calculate the threshold using an equation which defines the threshold as a function of the amount of food cooked and the elapsed time since the last filtration of the oil.

In accordance with another aspect of the invention, the system includes a baffle adjacent the oil return inlet for forming a flow of filtered oil for rinsing the vat.

In accordance with another aspect of the present invention an automated method of maintaining a level of oil in a fry vat having a volume is provided that includes automatically monitoring the level of oil in the fry vat device and sensing the level of oil in the fry vat. When the sensed level of oil is less than or equal to a first predetermined level, oil is automatically added into the fry vat at a low average flow rate relative to the volume of the oil in the fry vat. The low average flow rate is in the range of from about 0.008 to about 0.08 pounds per minute per pound of oil present in the fry vat at the first predetermined level. The oil is added at the low average flow rate to avoid a temperature drop of more than about 15° F. and preferably more than about 10° F. or 5° F. in the bulk oil present in the fry vat as a result of the adding of the oil.

In accordance with another aspect of the present invention the method includes causing the oil to enter the fry vat at a desired location or locations, which may be, for example, along a sidewall of the fry vat.

In accordance with another aspect of the present invention the oil is added at a low average flow rate to avoid a bulk temperature drop of the oil in the fry vat of more than about 15° F. when adding the oil, preferably about 10° F. and more preferably about 5° F.

In accordance with another aspect of the invention the make-up oil is added to the fry vat at an average flow rate of from about 0.008 to about 0.08 gallons per minute per gallon of oil present in the fry vat at the first predetermined level.

In accordance with another aspect of the invention the oil is added at a low average flow rate that continues until the level of oil in the fry vat reaches a second predetermined level.

DETAILED DESCRIPTION OF THE INVENTION

Figure 1:
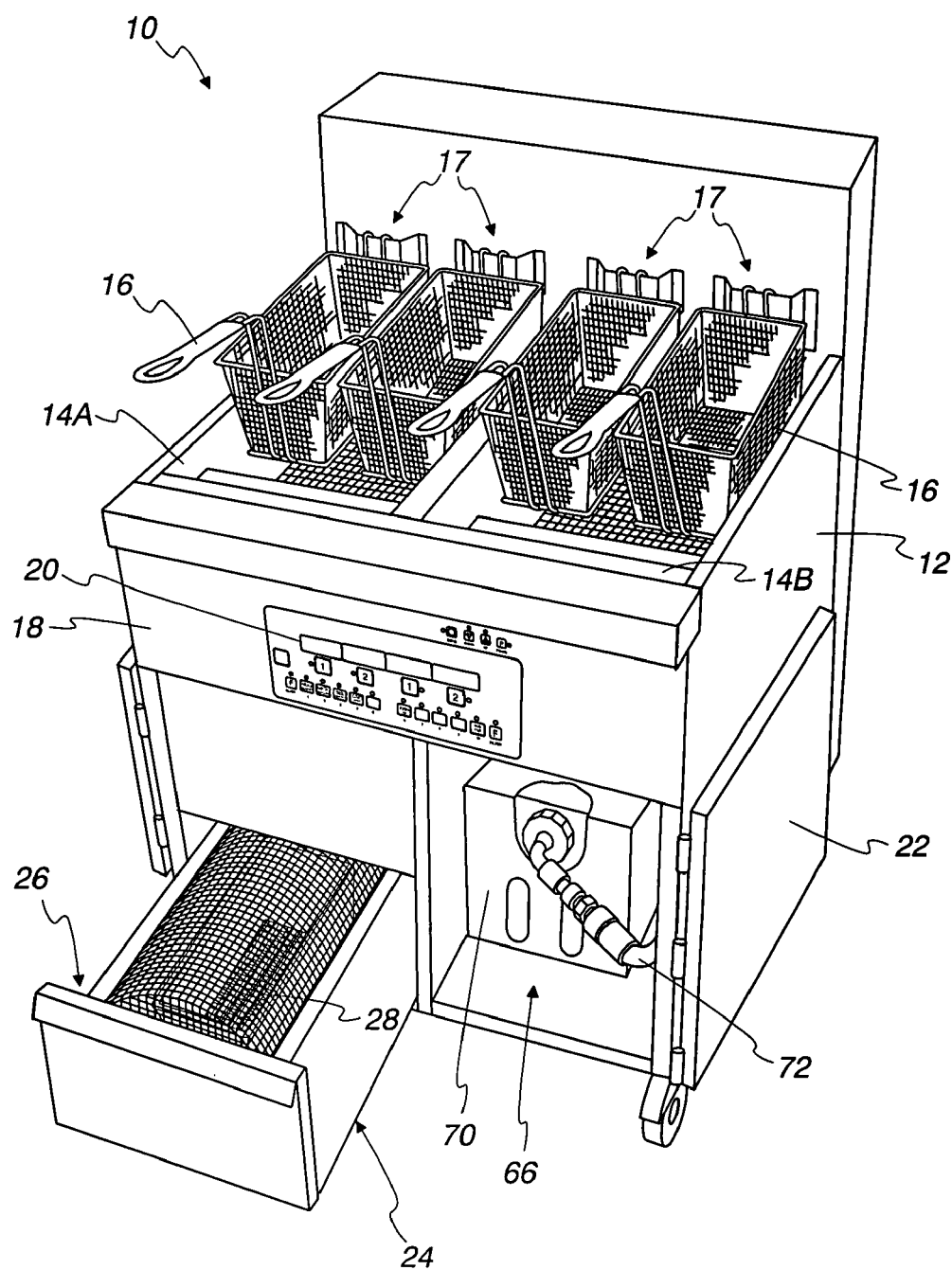
FIG. 1 is a front perspective view of one embodiment of a fryer including a filtration device.
Figure 2:
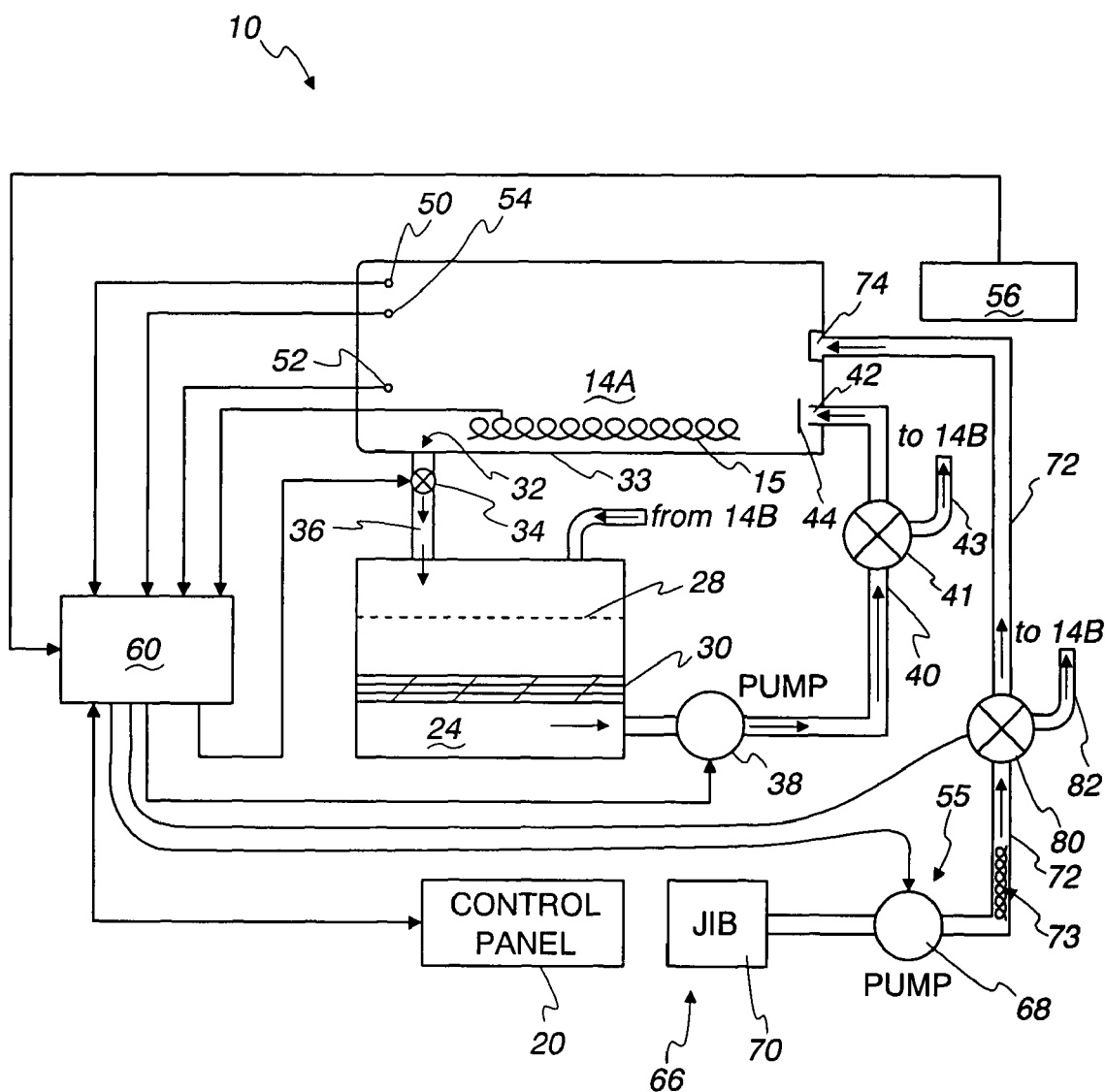
FIG. 2 is a schematic diagram of an automatic oil filtration system in accordance with the invention.

Referring to the Figures generally and in particular to FIGS. 1 and 2, a fryer 10 in accordance with the invention is illustrated. Fryer 10 includes a housing 12 and two fry vats 14A, 14B as illustrated. Each fry vat 14A, 14B is configured to accommodate two fry baskets 16 at the same time. Fry baskets 16 can be manually or automatically placed into a fry position and removed from vats 14A, 14B as is known in the art. Each of fry baskets 16 can be held by a respective bracket 17 in a holding position above the oil in vats 14A, 14B. Such an arrangement is well known in the art. Other fry vat configurations for a fryer are contemplated as desired, including a single vat, two vats as shown, three vats, or four or more vats. Each vat 14A, 14B is provided with a suitable heating element 15, which can be a gas burner or an electric heating element known in the art. Housing 12 of fryer 10 has a front panel 18 which includes a control and display panel 20 for fry vats 14A, 14B. Control and display panel 20 includes input keys or buttons and an alphanumeric display (such as an LED or LCD display) for controlling the various functions and monitoring the status of fryer 10 as hereafter described in more detail.

The lower portion of housing 12 has one or more doors 22 for providing access to the interior of the lower portion of housing 12. An oil pan 24 is positioned inside the lower portion of housing 12 behind doors 22. Oil pan 24 is preferably mounted in a slide-out drawer 26 for ease of access and removal for cleaning. A filter screen 28 and a filter element 30 are provided above or in an upper location in oil pan 24 for periodically screening and filtering the fry vat oil to remove unwanted food debris from the frying of food products.

Figure 5:
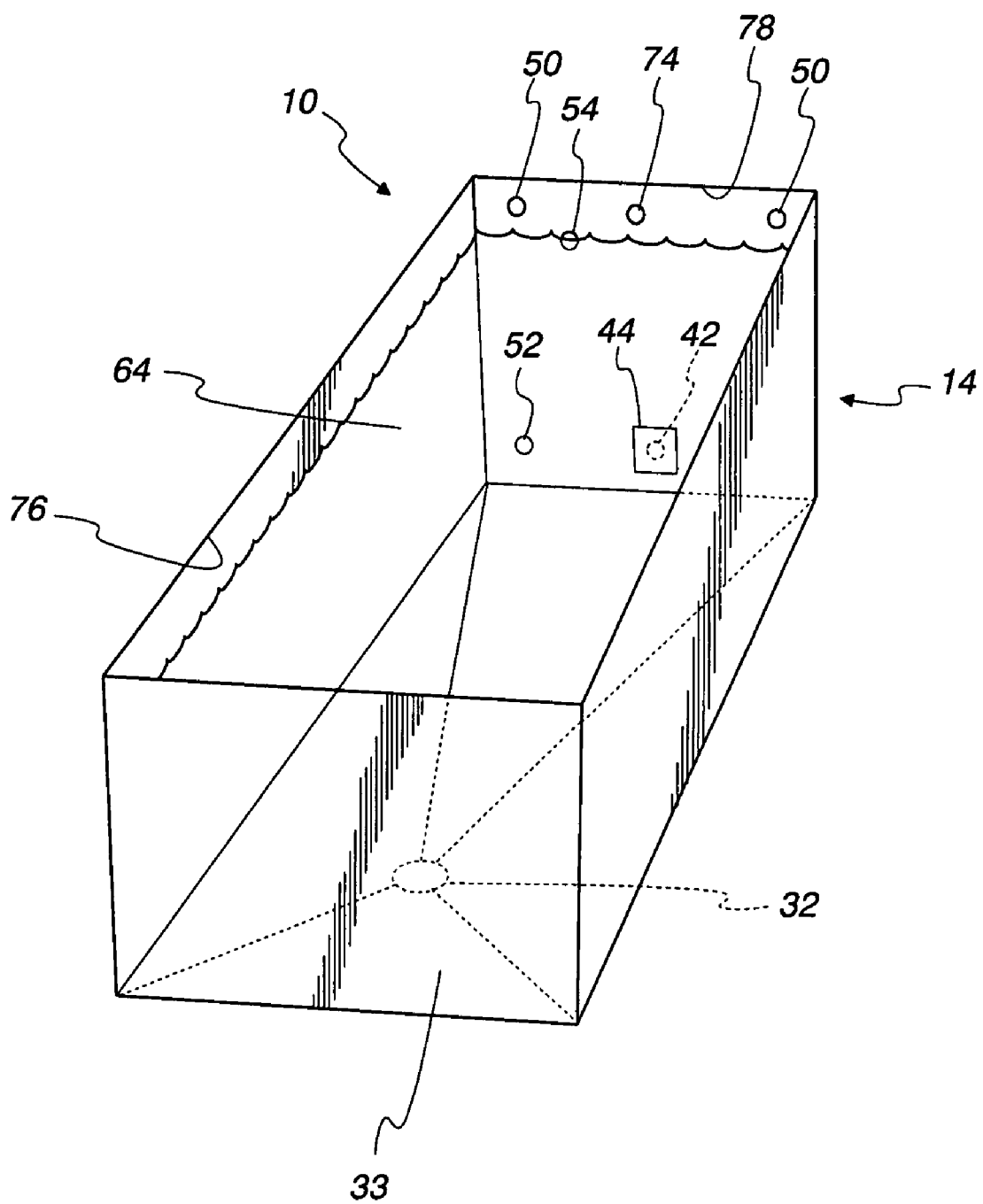
FIG. 5 is a front perspective view of a fry vat of the fryer.

Referring to FIGS. 1, 2 and 5, each vat 14A, 14B has an oil outlet or drain 32 at its bottom 33 which slopes towards oil outlet 32 and a solenoid-controlled valve 34 located under oil outlet 32. Bottom 33 of each vat 14A, 14B is preferably a generally flat surface including surfaces sloping toward oil outlet 32 to facilitate draining of oil and debris from vats 14A, 14B. When the oil in one of vats 14A, 14B is to be filtered, associated valve 34 is opened so that oil is drained from vat 14A via oil outlet 32 and is directed via piping 36 to filter screen 28 for removal of larger debris particles and then through filter element 30 for removal of smaller particles. Filter element 30 may include a stainless steel wire mesh or other suitable filter material. Alternately, a disposable paper filter or pad (not shown) may be placed on top of filter screen 28 or filter element 30, and, if desired, a filter powder such as one containing diatomaceous earth may be sprinkled on the paper, as is known in the art. A similar arrangement is provided for vat 14B using the same oil pan 24, filter screen 28, filter element 30 and other equipment as shown in FIG. 2, for example.

After passing through filter element 30, the filtered oil is returned to vat 14A or 14B by a pump 38 via oil return piping 40. A valve 41 directs the filtered oil to vat 14A or 14B via piping 40 and 43. Oil is returned to vat 14A via an oil return inlet 42. Preferably, as shown in FIG. 5, a deflector 44 is provided in each of vats 14A and 14B adjacent oil return inlet 42 to deflect the stream of oil into a broader stream or spray to rinse any remaining debris from the bottom of vats 14A and 14B.

Referring to FIGS. 2 and 5, a basket sensor 50 may optionally be located in each of vats 14A and 14B to detect each time a basket 16 is placed into and removed from one of vats 14A and 14B. Basket sensor 50 may be, e.g., an optical or electro-mechanical device. A temperature sensor 52 (such as a thermocouple or an RTD (a resistance temperature detector)) and an oil level sensor 54 are also provided in each vat 14A and 14B. An automatic oil filling system 55 may also be provided to fill, refill or top off vats 14A, 14B with fresh oil that is pumped by a pump 68 from an oil supply 66 through a solenoid-controlled valve 80 and piping 72 to discharge into vat 14 at a location therein as desired. The oil used for fryer 10 may be any suitable type of cooking oil that typically can be used for cooking food product. In typical use, each batch of food to be fried generally may be uniform and predetermined or pre-measured, and thus the total amount of food cooked by weight can be calculated by simply counting the number of batches cooked. Alternately, a scale 56 may be provided for weighing food products before they are cooked to monitor the amount by weight of food that has been cooked.

A controller 60 is provided to control food product cooking cycles, monitoring the heat history of the cooking oil (i.e., time since food cooking began) and the number of batches of food products cooked in each vat 14A and 14B, to control the filtration process, and to control the oil top-off process. As shown in FIG. 2, controller 60 receives inputs from basket sensor 50, temperature sensor 52 and oil level sensor 54 in each vat 14A, 14B, scale 56 (if present), and human operator inputs from keys or buttons on control and display panel 20. Controller 60 outputs display signals to control and display panel 20, and control signals to burner or heating element 15, valves 34, 41 and 80, pumps 38 and 68, and other components of fryer 10. Controller 60 may be, e.g., a PC (personal computer), dedicated microcontroller (such as for each vat as desired), microprocessor or custom logic device.

Figure 3:
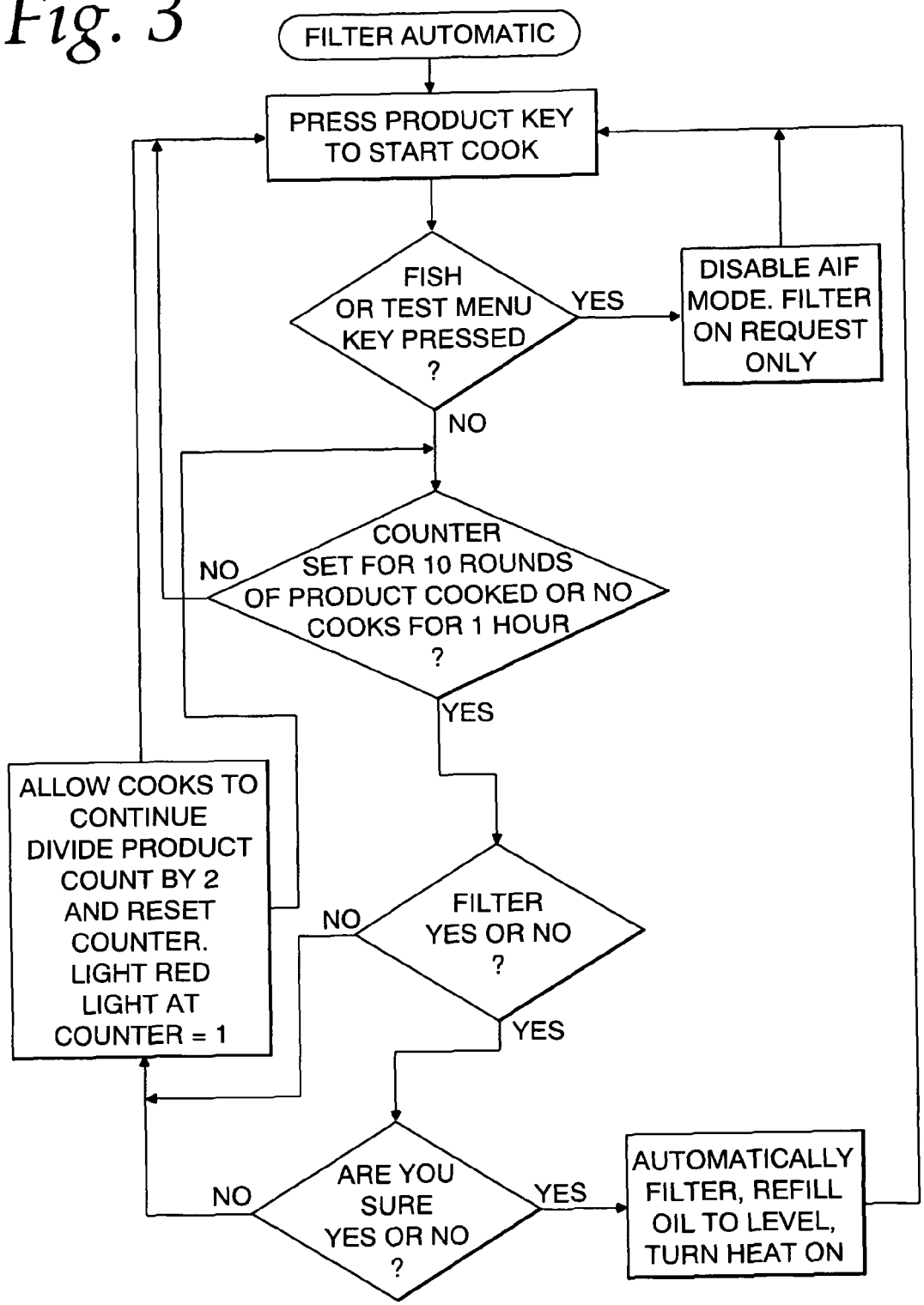
FIG. 3 is a flow chart for an intermittent automatic oil filtration method in accordance with the invention.

FIG. 3 is a flowchart of an automated intermittent filtering (AIF) method in accordance with the invention. Vat 14 is filled with oil and heated to the appropriate cooking temperature. Food products are placed in basket 16 and basket 16 is lowered into the hot oil in vat 14. In embodiments having optional basket sensor 50, as basket 16 enters vat 14, it triggers basket sensor 50 which sends a signal to controller 60. Where there is no basket sensor, for example, the operator presses a product key on control and display panel 20 to initiate the programmed cooking cycle for the food product, e.g., French fries. The programmed cooking cycle includes the appropriate cooking time and temperature for the selected food product.

In response to the product key activation, the system checks to see if a special type key on control and display panel 20 was selected. For example, since fish products have different characteristics from many other food products, it may be desirable to utilize a vat only for fish products and to filter the cooking oil on request only, when the operator believes filtration may be desirable (which may be more frequently than for milder-flavored food such as French fries). Thus, if the "fish" product key is selected, the system disables the AIF mode and will filter only when manually commanded to do so.

If no special type key has been activated, a batch counter is set and incremented. A batch is counted each time the operator presses a key on control and display panel 20 to initiate a cooking cycle for a batch of food. Alternately, a batch may be counted when basket 16 passes basket sensor 50 as basket 16 is lowered into vat 14. The current batch count may be displayed on control and display panel 20, if desired. The system also monitors the elapsed time since the oil was heated to cooking temperature. When the counter reaches a predetermined number, e.g., 10, indicating that 10 batches of food products have been cooked, and/or when a predetermined time, e.g., one hour, has elapsed during which the oil has been at cooking temperature or another predetermined temperature, a filter routine is initiated.

Controller 60 stores time and batch count information to determine when to initiate a filter routine. The elapsed time since the last filtration of the oil, together with the number of batches and/or quantity by weight of food cooked in the oil, provides a more meaningful indication of when the oil should be filtered for optimum cooking performance and extended useful life of the oil than a batch count alone.

As noted above, in a typical restaurant, the total amount of food cooked by weight can often be calculated by simply counting the number of batches cooked, since each batch of food to be fried is pre-measured. For example, a batch of French fries may be standardized at about 1.5 pounds.

The threshold for triggering filtration may be expressed as an equation which defines the threshold $F_{th}$ as a function of the amount of food cooked and the elapsed time, e.g., $$b+kt=F_{th}$$

where
b=number of batches of food cooked
k=a constant, selected to achieve the desired filtration frequency
t=time units elapsed since last filtration In an exemplary embodiment, time unit t may be expressed as fraction of one hour. For example, one unit t may be defined as 1/10 of an hour (six minutes) and constant k may be 1. The threshold F may be set at 10. In this example, a filter routine will be triggered when the sum of the number of batches b and the number of 1/10 hour intervals since the last filtration equals 10. It has been found that in periods of more or less continuous cooking (e.g., during busy times at a restaurant) where each batch of food cooks in about 3 minutes, filtering the oil every 10 batches (that is, about every 30 minutes) maintains excellent oil quality and uniformity, thereby providing improved and more uniform cooking results compared to infrequent filtering, such as filtering at the end of a day of frying food. During periods of more intermittent cooking (e.g. during slower times at a restaurant), when only a few batches may be cooked in an hour, it has been found that oil quality will deteriorate over time as some food debris (for example, such as crumbs from breading) remains in the hot oil and will continue to carbonize. Using the elapsed time units t in combination with the number of batches b ensures that the oil will be filtered at appropriate intervals even during periods of intermittent cooking, thus maintaining oil quality. Thus, the system and method of the invention account for both continuous and intermittent cooking periods and deliver improved oil and food quality. The equation and constant k may be programmed into controller 60, which will use data from control and display panel 20, basket sensor 50 (if used), and/or scale 56 to calculate the threshold.

During the filtering process, burner or heating element 15 for the vat 14 to be filtered is turned off. Solenoid-controlled valve 34 at bottom 33 of vat 14 is opened, and oil flows through outlet or drain opening 32 and piping 36 to filter screen 28 and filter element 30 where debris is removed from the oil.

Pump 38 is then turned on to send a quantity of filtered oil to vat 14 via oil return inlet 42 to rinse vat 14. In this manner, food, residual crumbs and other debris can be removed from vat 14 before filling with filtered oil. Valve 34 remains open. After a predetermined rinse time, e.g., one minute, valve 34 closes and pump 38 can remain on to refill vat 14 or alternatively pump 38 is turned off and the rinse oil drains from vat 14 back to the filter where debris is removed and the rinse cycle may be repeated, if desired, before refilling vat 14. In one embodiment, when the oil reaches the level of heating element 15, heating element 15 is activated to reheat the oil in vat 14.

Alternatively, upon completion of the filtration and rinse cycles, valve 34 is closed and pump 38 is turned on. Filtered oil is pumped back into vat 14, and fresh oil is added, if needed, either manually or by automatic oil filling system 55, to reach the proper oil level as detected by oil level sensor 54. Burner or heating element 15 is turned back on (for example, when the oil level covers heating element 15) and the oil brought back to cooking temperature. Regardless of the particular filtration embodiment, all of the foregoing steps are controlled automatically by software running on controller 60.

Optionally, before the filter routine is initiated, the human operator may be prompted and asked whether he wishes to filter the oil at that time. He may choose to delay filtering if, for example, it is a very busy time at the restaurant and he does not wish to take the vat out of service. If the operator presses the "no" button on control panel 20, filtration will be delayed and cooking will be allowed to continue. However, the product count will be divided by 2 and the counter will be reset, so that the next prompt for filtration will occur sooner. Optionally, a red light or LED on control panel 20 or other indicator may be triggered when the count reaches 1 to alert the operator that filtration will be due on the next cooking cycle. Optionally, the system may prompt the operator for a yes or no response to a message such as "Are you sure?" after the operator enters a command as to whether to filter at that time.

Figure 4:
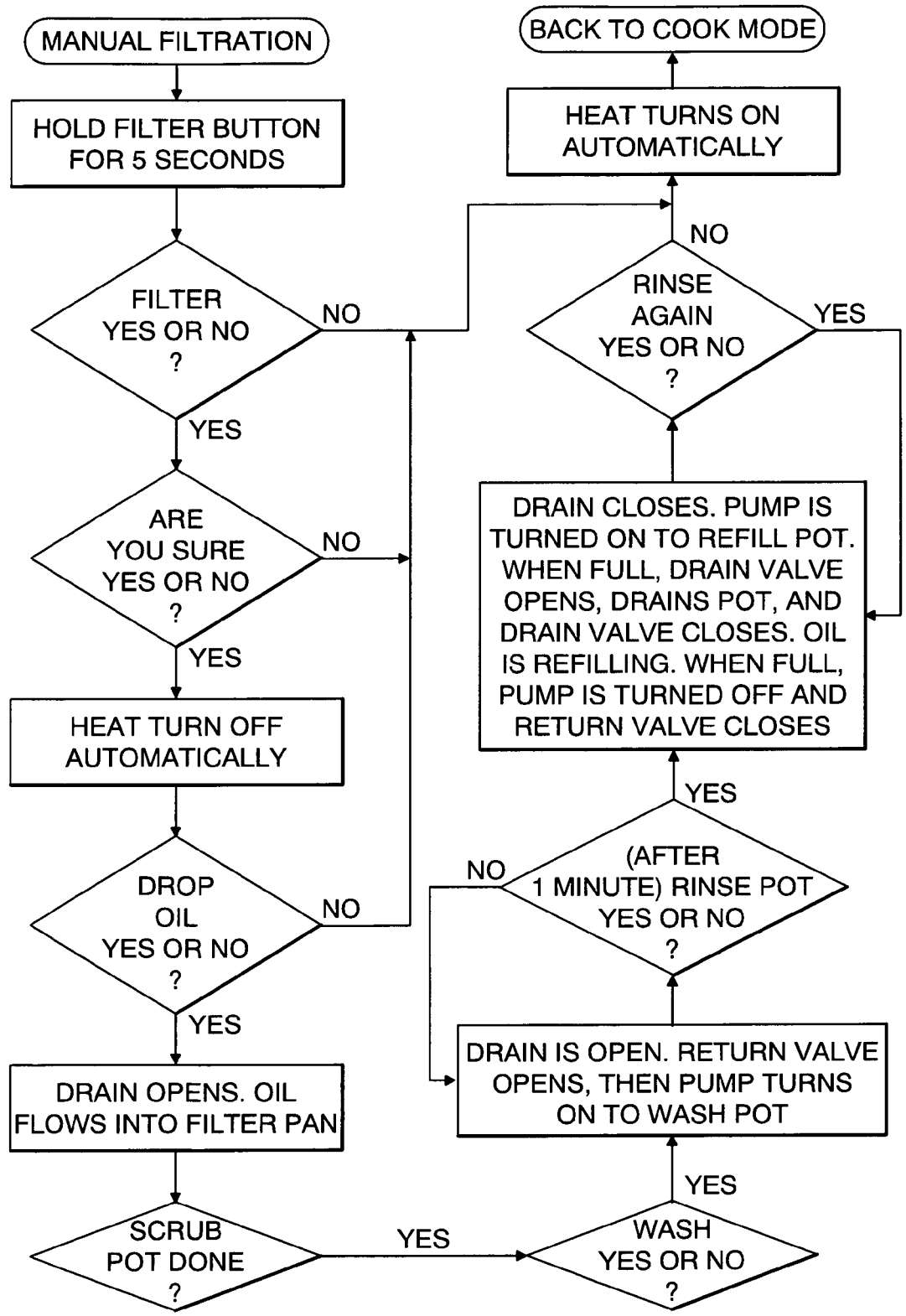
FIG. 4 is a flow chart for a filter on request filtration method in accordance with the invention.

As seen in FIG. 4, a manual filtration method may also be provided. The manual filtration process is initiated when the operator presses and holds the "filter" key on control and display panel 20. Preferably, the operator must depress and hold the key for a defined time, e.g., five seconds, to avoid accidentally triggering the filtration cycle. The system prompts the operator to confirm that he wishes to filter, and if he confirms, turns off burner or heating element 15 for the selected vat 14. The system then prompts the operator by asking if he wants to drop the oil. If he responds by pressing the "yes" key, valve 34 is opened and the oil drains from vat 14 to oil pan 24 for filtering as previously described. If at any point in response to a prompt the operator selects "no" burner or heating element 15 is turned back on and the system returns to cooking mode.

The system then prompts whether the operator wishes to rinse vat 14. If yes, valve 34 is left open, and pump 38 is turned on to rinse vat 14 with clean oil. After a predetermined rinse time (e.g., one minute), valve 34 is closed and pump 38 is turned on to refill vat 14. As shown in FIG. 4, the rinse cycle may be repeated if desired. After the final rinse is completed, burner or heating element 15 is turned on to bring the oil back up to cooking temperature and the system returns to cooking mode. This rinsing operation flushes food crumbs and other food debris from the vat through drain 32.

In one embodiment, the combined monitoring of the elapsed time since the last filtration of the oil and the number of batches of food products which have been cooked provides a more accurate determination of oil quality and ensures that filtration is performed at the optimum point in time. It has been found that the automatic filtration process done in this manner can be accomplished very quickly, e.g., for a typical-size fryer vat the filtration can be completed in as little as about three or four minutes depending on the size of the fry vat, such as for a 15 or 30 pounds of oil vat. As a result, restaurant operators can filter oil more often and more conveniently, even during the business day, thus extending the oil's useful life and yielding considerable cost savings and reducing the volume of discarded oil.

Turning now to additional aspects of the invention, it is noted that prior to beginning cooking operations, vat 14 is filled to a predetermined nominal level of cooking oil 64 to provide a predetermined oil weight and/or depth. As discussed below in detail, the present invention provides optimal oil usage by selecting a predetermined amount of oil depending upon the type of food to be cooked, the typical discrete batch size of the food, the maximum amount of food cooked in vat 14 at any given time, the amount of oil that will be absorbed by the food product during cooking, the turnover ratio of oil for a batch of food cooked, and the number of batches anticipated to be cooked over a given extended time period of operation so as to achieve at least one turnover of cooking oil 64. By operating in accordance with this aspect of the invention, oil usage is minimized over an extended period of commercial operation of fryer 10, while at the same time maintaining a high quality for the finished cooked food products.

During the process of cooking a food product, an amount of oil is absorbed by the food. The amount of oil absorbed is referred to as the oil uptake. In order to keep the level of oil 64 of vat 14 at, or near, the predetermined nominal level selected in accordance with the invention, it is necessary to periodically add replacement oil to vat 14. As noted previously, for automatically replacing oil uptake, oil supply 66, oil level sensor 54 and pump 68 are provided for pumping oil from oil supply 66 to vat 14. Oil level sensor 54 may be any suitable device for sensing oil level, including by way of example, sensing based on optical sensing, weight sensing, or level sensing based on the temperature difference between the temperature measured adjacent oil level sensor 54 and the temperature of heated cooking oil 64. In regard to the latter sensing method, it is noted that as the level of heated cooking oil 64 drops below the position of oil level sensor 54, the temperature at sensor 54 also drops. This temperature differential can be the basis for controller 60 initiating the addition of replacement oil to vat 14 until oil level sensor 54 indicates a temperature expected at sensor 54 when cooking oil 64 is returned to the desired predetermined level.

Oil supply 66 can be held in any suitable container, such as for example, a jug-in-box container 70 or a bulk source of oil stored at a remote location (not shown). Container 70 may be stored within housing 12, or at a remote location. Oil replacement piping 72 provides a fluid passageway from oil container 70 to vat 14 and may have a heating element 73 associated with it to heat replacement oil as hereafter described. In the illustrated embodiment, piping 72 terminates at an oil inlet 74 on one of sidewalls 76 of vat 14, such as rear sidewall 78 as shown in FIG. 5. It is to be understood that the oil inlet can be located at any desirable location so that replacement or make-up oil will be discharged into fry vat 14. Whenever oil level sensor 54 senses that the level of oil in vat 14 has dropped a predetermined amount from the nominal oil amount, controller 60 activates pump 68 to cause replacement oil to be pumped from oil container 70 to vat 14 via piping 72. As shown in FIGS. 1 and 2, a single oil container 70 and a single oil pump 68 may be used to provide replacement oil for both vats 14A and 14B by directing oil flow though solenoid-controlled valve 80 or other suitable valve. Valve 80 is control by controller 60 and is movable between various valve positions to direct oil replacement flow to either both of vats 14A and 14B, solely to vat 14A, or solely to vat 14B through piping 82, depending on the need for replacement oil as sensed by sensor 54. If no replacement oil is needed in either of vats 14A or 14B, valve 80 is closed to prevent flow through valve 80. Alternatively, each of vats 14A and 14B may have its own dedicated oil supply 66, valve 80 and/or pump 68.

The pumping of replacement, or top-off oil, takes place at low average flow rates and continues until the oil level in vat 14 is replenished to the full or nominal oil level. Once oil level sensor 54 senses this has been accomplished, controller 60 deactivates pump 68 to stop the further flow of replacement oil. The replacement oil may be added in a continuous flow, or alternatively can be added in intermittent flow such as by pumping individual doses, for example one dose of about a ½ pound slug or aliquot of replacement oil that is dispensed at oil inlet 74 every 60 seconds or greater period of time until the full or nominal oil level is reached.

The addition of ambient temperature replacement oil (and oil at a temperature less than the normal cooking oil temperature) will cause a drop in the temperature of heated cooking oil 64 in vat 14. To avoid the unacceptable temperature decline and to produce consistent high quality food product, it is advantageous to maintain a relatively consistent cooking temperature for cooking oil 64 over the cooking cycle of the food product. Therefore, in accordance with the invention, the addition of replacement oil is done in a manner to avoid a temperature drop that adversely affects the cooking ability of the heated bulk vat oil. Preferably, the introduction of replacement oil is done in a manner that avoids a temperature drop of the heated bulk oil in the fry vat of more than about 10° F., more preferably less than or equal to about 5° F. When replacement oil is added in this manner the performance for frying is not adversely affected. Specifically, a batch of food being fried during the addition of replacement oil is not adversely affected, nor is the ability of the fryer to accept new batches of food adversely affected.

The temperature drop experienced will depend primarily upon, (1) the temperature of the heated cooking oil in the vat, (2) the temperature of the replacement oil added and (3) the relative amount of replacement oil and the amount of oil present in the vat. The objective of the present invention in limiting the bulk temperature drop for the heated vat oil is accomplished by adding replacement oil at a low average flow rate relative to the sensed amount of oil present in the vat, and/or by causing the initiation of the addition of replacement oil whenever a relatively low amount of drop in oil level from the nominal level is experienced or detected.

In regard to the latter, controller 60 initiates the flow of replacement oil by activation of pump 68 whenever the amount of the oil drop reaches a predetermined set point. Preferably, this set point is selected to cause activation of replacement oil flow when the oil drop represents about a 0.02 pound drop in replacement oil per pound of nominal oil of the fry vat, or less. More preferably, the set point is about 0.015 pounds per pound of nominal vat oil for replacement oil at about ambient temperature. Thus, where the nominal amount of cooking oil 64 is, for example, 30 pounds, preferably the set point for initiating the addition of replacement oil at ambient temperature would be at a drop in oil level of about 0.6 pounds or less; and the more preferable set point to initiate the flow of replacement oil at ambient temperature would be at about 0.45 pound drop or less in oil level from the nominal oil level for cooking.

In another embodiment of the invention, the replacement oil is added to vat 14 at a low average flow rate relative to amount of oil present in the vat when the addition of replacement oil is added. For oil added at ambient temperature, preferably the average flow rate is in the range of about 0.008 pounds per minute per pound of vat oil to an upper limit of about 0.08 pounds per minute per pound of vat oil, or less. For example, for a vat 14 that has 30 pounds of vat oil present in vat 14 when the replacement oil is added, the average flow rate of replacement oil would be in the preferred range of about 0.24 pounds per minute of replacement oil to about an upper range of about 2.4 pounds per minute of replacement oil, or less. Oil can be added at a higher rate average flow rate, and the set point for initiating the flow of replacement oil can be set at a greater drop in vat oil, when the replacement oil is heated above ambient temperature.

In still another embodiment of the invention, the replacement or make-up oil can be heated by a suitable heat source, such as an electric resistance heating element 73 that may be associated with oil replacement piping 72. The oil may be heated to a temperature as desired, such as, for example, about 100° F., 200° F., 300° F. or higher, generally up to the cooking temperature of the oil and anywhere in a temperature range of about 100° F. up to about the cooking oil temperature of vat 14. Higher replacement oil temperature (generally up to the normal cooking oil temperature) permits a higher flow rate of the replacement oil without excessively cooling the oil in the fry vat (preferably not more than a 10° F. temperature drop and most preferably a 5° F. temperature drop or less).

It is noted that the flow rates set forth above are average flow rates, and thus the actual flow rate over a short period of time, for example five seconds, may be at times higher than the average flow rate of replacement oil taken over a longer period of time, for example 1 minute. For example, the addition of a slug or aliquot of 0.5 pound of replacement oil over a six second period followed by no additional replacement oil for fifty four seconds, is considered an average flow rate of 0.5 pound per minute, or 0.016 pounds per minute per pound of vat oil present, for a vat 14 having 30 pounds of vat oil present in vat 14 when the replacement oil is added. Likewise, a continuous flow of replacement oil at 2.5 pounds per minute that is stopped after ¼ minute is considered as an average flow rate of 0.625 pounds per minute, or 0.0208 pounds per minute of replacement oil per pound of vat oil present, for a vat having 30 pounds of oil present when the replacement oil is added.

It is also noted that since the temperature of heated cooking oil 64 drops as ambient temperature replacement oil is added, controller 60 can be programmed to activate heating element 15, if not already activated, in anticipation of, and/or during, the addition of replacement oil. Controller 60 can also be programmed to stop the flow of replacement oil, when it is detected that a greater than about five degree temperature drop in the cooking oil 64 has been caused by the addition of replacement oil; and resume the addition of replacement oil when the temperature of vat oil has recovered by increasing at least a predetermined amount.

In commercial cooking operations, such as a high volume quick-service restaurant, particular consideration also needs to be directed to changes in the quality of the cooking oil. This may be because the cooking process causes degradation of the oil due to increases in the amount of impurities that accumulate in cooking oil 64 over a period of time. For example, as previously noted the cooking of food products increases the levels of free fatty acids and total polar compounds in the oil. In addition, cooking oil may degrade over a period of time due to the oil being subjected to an elevated cooking temperature. Regardless of the reason, after extended use, the quality of the oil decreases to a point where the degraded oil begins to noticeably affect the quality of the cooked food product. Most significantly, the taste and texture of the final food product drops below acceptable standards of quality. Thus, in order to maintain high quality food production, it is necessary to periodically change cooking oil 64. Changing cooking oil 64 typically is accomplished by withdrawing or draining substantially all of cooking oil 64 and then refilling vat 14 with fresh oil to the predetermined level of oil. Draining cooking oil 64 may be conveniently accomplished by opening valve 34 to drain cooking oil 64 through outlet 32, piping 36 and into oil pan 24, and thereafter discarding the oil from pan 24. During the process of changing the oil, the surfaces of vat 14 may also be manually or otherwise cleaned of any residue or debris and/or degraded oil. Refilling vat 14 with cooking oil 64 may be accomplished by manually refilling vat 14 with fresh oil, or by pumping fresh oil from a bulk oil source or from oil source 66 and into vat 14 at oil inlet 74.

Determining the point in time when changing the oil of vat 14 becomes necessary can be ascertained by various test methods as are well known to those skilled in the art. Briefly, these tests include the testing of the taste of cooked food, inspecting oil characteristics during cooking, observing the amount of smoke given off during cooking, and comparing the color of the used cooking oil 64 to known color standards. In the taste test, cooked food products are tasted for a burnt, bitter, or rancid taste. If any such taste is experienced, the oil requires changing. When cooking with oil of an acceptable quality, brisk bubbles (relatively fast rising) come off the food product as it cooks. The observation of slow, lazy bubbles (relatively slow rising) indicates oil decomposition has taken place and that cooking oil 64 needs to be discarded. Also, any oil that produces excessive yellow foam requires changing. Additionally, excessive smoking during cooking, often accompanied by yellow foaming and an off taste, is a sign of oil deterioration to an extent that the oil should be discarded and replaced.

A colorimetric test also can be utilized to determine whether the oil needs replacement. Oil naturally darkens as it ages and is used for cooking. The oil color of the used vat oil can be tested and compared to a color standard of an acceptable quality. Color testing typically includes using an eye dropper or other suitable device to remove a small sample of the vat oil and then holding the vat sample next to an oil color standard to compare the color of the vat sample to the color standard. The oil color standard can be selected to have the color of oil that is fresh, or another standard color, such as the color of oil that has been used for an extended period of time, but has not yet reached the point of requiring the discarding of the oil. It is noted that since the changes in color in the vat oil vary depending on the type of food cooked, each food type may have its own guide standard for comparison with the color of vat samples tested. If the color of the oil sample withdrawn from the vat is clearly lighter than the darker color of the color standard, an oil change would not be indicated. If the oil is close to, or slightly exceeds the darker color of the color standard, such a result would prompt further scrutiny of the oil quality, such as by further testing with the previously mentioned test methods. If the sample color is much darker than the standard color, an oil change typically would be warranted.

In accordance with one aspect of the invention, the need to sample and test oil quality can be reduced or eliminated by changing the oil after a predetermined amount of food is cooked and/or time of use has been reached.

In addition to labor and expense of monitoring oil quality to maintain cooked food quality, the cost of the cooking oil used over a period of time is of considerable importance in commercial restaurant frying operations. This is especially true when considering the large quantities of cooking oil that are consumed with high volume cooking applications in restaurants. In frying foods such as French fries and chicken, for example, the cooking oil costs are a significant percentage of the total costs of producing the cooked product, and therefore the annual amount spent on cooking oil can be substantial. Thus, an important objective achieved by this invention is the reduction of oil costs by increasing the amount of food that can be cooked over time for a given amount of cooking oil usage without sacrificing the quality of the cooked products.

The reduced oil usage is inherently accomplished by conducting cooking operations in accordance with the present invention. Preferably, the food products are cooked in discrete predetermined batch sizes or generally predetermined and uniform weight batch sizes, using relatively low amounts of vat oil per weight of food cooked per batch or basket. Typically, these amounts are predetermined as a ratio of precooked food weight relative to oil weight. Other aspects are periodically adding replacement oil to the vat to compensate for oil uptake during cooking, providing relatively high oil turnover per batch of food cooked (oil turnover ratio) that are within a specified range, and cooking a sufficient number of batches within a specified period of operation to achieve at least one oil turnover. As discussed subsequently in greater detail, an oil turnover is considered to have occurred when the weight of oil uptake by the total amount of food cooked over a period of time equals the weight of the nominal oil weight of the fry vat. Thus, for a vat that holds 30 pounds of oil during frying, 30 pounds of oil would have been consumed or absorbed by the food cooked therein. Amounts of oil vaporized or otherwise lost by, for example, splashing out of the vat or otherwise, are relatively small and can typically be ignored.

The present invention makes it practical to produce high quality food, and provides high quality methods for cooking quick-service foods, including French fries and chicken nuggets, strips, breasts, pieces and the like. For a quick-service restaurant in accordance with the invention, high quality French fries typically are cooked in discrete batches of frozen French fries that weigh between about 1.125 pounds to 3.0 pounds per batch and may be, for example, a 1.5 pound batch. The French fries are cooked in vat oil heated to a desired temperature, which typically may be in the range of about 320 to about 335° F. (168° C.), or as otherwise desired. Controller 60 can operate heating element 15 to maintain the temperature in this range or as otherwise desired. It is noted that when simultaneously cooking an amount of frozen French fries having a total weight greater than 1.5 pounds, preferably vat 14 (a vat that is configured to contain 30 pounds of cooking oil during operation) is equipped with two fry baskets 16. Thus, if for example 3 pounds of French fries are to be cooked at the same time, preferably a batch of size of about 1.5 pounds would be placed in each of two fry baskets 16. It is also noted that when cooking using multiple fry baskets 16, the fry baskets 16 desirably are sequentially lowered in the vat, at least 30 seconds apart. This is done so the temperature of the oil can recover from the temperature drop caused by submerging the first fry basket 16 of frozen French fries, prior to submerging the next batch contained in the second fry basket 16. Typically, when cooking high quality French fries, the depth of the oil is preferably such that the frozen French fry batch can be submerged when initially placed into the oil so that the uppermost part of the batch is preferably submerged below the surface of the oil. In exemplary 1½ pound batch sizes the depth of the vat oil may typically be on the order of about 3.8 or about 4 inches. As the French fries cook, they lose water and eventually tend to float on the oil. Each batch preferably is cooked for a predetermined period of time that depends on the type and size of the food product. One type of French fry is cooked for about 3 minutes, for example. Setting cooking times is well known in the art and can vary depending on food type, configuration of the food product, including surface area of the food relative to food mass, the temperature of the food product when placed in the vat, and other factors.

In practicing the present invention to reduce oil usage, the amount of cooking oil 64 used in vat 14 is optimized relative to the discrete batch sizes of uncooked food and the total amount of food to be cooked at any given time. For example, if fryer 10 is to be used for cooking batch sizes of frozen French fries weighing about 1.125 pounds to about 3.0 pounds, a predetermined nominal amount of cooking oil 64 is placed in vat 14 so that the weight of the uncooked intended batch sizes are about 0.0375 to about 0.1 of the weight of the cooking oil 64 in vat 14. Thus, for a batch size of about 1.5 pounds, preferably from about 15 to about 40 pounds of vat oil would be used for cooking in vat 14. It is additionally noted that, preferably the maximum total amount of food cooked in vat 14 at any given time will be less than or equal to 0.1 times the weight of cooking oil 64. For example, if the amount of cooking oil 64 is 30 pounds, no more than about 3 pounds of frozen French fries or other food product would be cooked at the same time. This can be accomplished, for example, in a 30 pound oil vat having space for two fry baskets, each for holding 1.5 pounds of French fries or other food per basket.

Cooking of frozen French fries typically results in an oil uptake by the food by weight of the uncooked frozen French fries in the range of from about 5.5% to about 8%. Cooking of protein-type food products, such as chicken and fish fillets, typically results in an oil uptake by the food by weight of the uncooked food in a range of from about 5.5 to about 13%.

Depending on the type of food cooking operation, a single vat 14 might be used more than a single type of food. For example, in one type of operation a vat might be dedicated to cook only frozen French fries or only chicken pieces. In other instances, the vat may be used to cook both French fries and chicken pieces. In such instances over a period of time, the oil uptake achieved during cooking can range from about 5.5% to about 13% by weight of the precooked food. Thus, in cooking the various types of foods, the typical turnover ratio accomplished by the absorbed, or oil uptake amount during cooking is in the range of about 0.0026 to 0.007 per discrete 1.5 pound batch using about 30 pounds of cooking oil in the vat. By cooking a sufficient number of batches during the operating time in which the cooking oil is subjected to elevated cooking temperatures, a sufficient turnover rate for cooking oil 64 is achieved to enable the highly efficient oil usage of this invention resulting in increased oil life before oil changing is necessary or desirable. For example, a sufficient number of batches are cooked within an operating time period, such as within about 60 hours, to provide at least one turnover of cooking oil 64. This could occur, for example, after completion of six 10-hour working shifts. By way of a more specific alternative example, when cooking 1.5 pound batches of frozen French fries averaging an oil uptake of approximately 7% by weight of the uncooked French fries, cooking approximately 285 batches will achieve one turnover (30 pounds of oil) of cooking oil 64.

As illustrated by the following examples, by cooking and operating fryer 10 in accordance with the invention, a significant reduction in overall oil usage can be achieved without noticeable reductions in food quality.

EXAMPLE I

Conventional Food Frying

A fry vat of a fryer apparatus was filled to a conventional initial nominal cooking level of about 50 pounds of cooking oil. The oil was heated to a targeted cooking temperature of about 335° F. (168° C.) during daily periods of operation of approximately 10 continuous hours per day. The fry vat was used to sequentially fry numerous batches of frozen French fries with each batch weighing about 1.5 pounds prior to cooking. The batch weight of frozen French fries relative to the weight of the vat oil was 0.030. Whenever two 1.5 pound batches of fries were to be cooked simultaneously, at least a 30 second delay was provided between submerging the first fry basket holding the first batch, and the second fry basket holding the second batch of frozen fries. No more than two batches, for a total of about 3 lbs of frozen French fries, were cooked at the same time. Thus, the maximum weight of the food cooked at any given time was 0.06 times the weight of the 50 pounds of cooking oil in the vat. The fries were lowered into the fry vat and cooked for a cooking period of about 3 minutes. Additional batches were sequentially cooked in a like manner so that approximately 100 pounds of frozen French fries were cooked each day. Each day of operation consisted of a continuous operating period during the restaurant operation. During the daily operational period, the oil was continuously maintained in the range of about 320° F. to about 335° F., including periods when no cooking of food product took place. At the end of the daily period of operation the heat was turned off and the vat oil was filtered and allowed to cool to room temperature until heated for beginning the period of restaurant operation the following day. During cooking, the frozen French fries absorbed a weight of cooking oil in the average amount of approximately 7% of the weight of the uncooked frozen French fries. The average turnover ratio per 1.5 pound batch of French fries cooked was about 0.0021. As the level of oil dropped, make-up oil was periodically added to the vat to maintain the amount of oil in the vat at approximately 50 pounds. The fryer apparatus was used in a like manner for six consecutive days. Approximately 100 pounds of frozen French fries were cooked each day of operation, for a total of approximately 600 pounds of French fries. During this time, the cooked French fries were periodically tasted and determined to have had an acceptable taste and quality level. The quality of the oil was also monitored. After 6 days of frying, the quality of the cooking oil had degraded to the point where the entire approximately 50 pounds of cooking oil in the vat needed replacement with fresh oil. During the 6 days of operation, approximately 42 pounds of make-up cooking oil were added to the vat to maintain the level of cooking oil in the vat at approximately 50 pounds. During this six day period, a turnover of approximately 84% of the nominal 50 pounds of the vat cooking oil was achieved which equates to an average 14% daily turnover rate. The total oil used over the 6 day period was approximately 92 pounds, which included the approximately 50 pound initial amount of cooking oil and the approximately 42 pounds of added make-up oil. The average weight of cooking oil used to fry 100 pounds of French fries was calculated to be 15.33 pounds.

EXAMPLE II

Frying Food in Accordance with the Invention

A fry vat of a fryer apparatus was filled to an initial nominal cooking level of about 30 pounds of cooking oil. The oil was heated to a targeted cooking temperature of about 335° F. (168° C.) during the period of operation. The fry vat was used to sequentially fry numerous batches of frozen French fries with each batch weighing about 1.5 pounds prior to cooking. The batch weight of frozen French fries relative to the weight of the vat oil was about 0.05. When two 1.5 pound batches of fries were to be cooked simultaneously, at least a 30 second delay was provided between submerging the first fry basket holding the first batch, and the second fry basket holding the second batch of frozen fries. No more than two batches, for a total of about 3 lbs of frozen French fries, were cooked at the same time. Thus, the maximum weight of the food cooked at any given time was 0.1 times the weight of the 30 pounds of cooking oil in the vat. The fries were lowered into the fry vat and cooked for a cooking period of about 3 minutes. Additional batches were sequentially cooked in a like manner so that approximately 100 pounds of frozen French fries were cooked each day. Each day of operation consisted of a continuous operating period as in Example I. During the operational period, the oil was continuously maintained in the range of about 320° F. to about 335° F. and heated as necessary to maintain the oil temperature in the desired range, including periods when no cooking of food product took place. At the end of the 10 hour period of operation the heat was turned off and the vat oil was allowed to cool to room temperature until heated for beginning the period of operation the following day. During cooking, the frozen French fries absorbed an average weight of cooking oil of approximately 7% of the weight of uncooked frozen French fries. The average turnover ratio per 1.5 pound batch of frozen French fries cooked was 0.0035 ((1.5 pound batch×0.07)/30 pound oil in vat). As the level of oil dropped, make-up oil was periodically added to the vat to maintain the amount of oil in the vat at a volume of approximately 30 pounds. The fryer apparatus was used in a like manner for twelve consecutive days. Approximately 100 pounds of frozen French fries were cooked each day, for a total of approximately 1200 pounds of French fries. During this time of operation, the cooked French fries were periodically tasted and determined to have had an acceptable taste and quality level. The quality of the oil was also monitored. After 12 days of frying, or an operation period of approximately 120 hours, the quality of the cooking oil was still sufficiently good to permit continued cooking. During the 12 days, approximately 84 pounds of make-up cooking oil were added to the vat to maintain the level of cooking oil in the vat at approximately 30 pounds. During the twelve-day period, a turnover of approximately 280% of the nominal 30 pounds of the vat cooking oil was achieved, which equates to an average 23.33% daily turnover rate. Stated another way, one turnover was achieved on the order of approximately 43 hours of vat operation in which 429 batches weighing 1.5 pounds were cooked. The total oil used over the 12 day period was approximately 114 pounds which included the approximately 30 pound initial nominal amount of cooking oil and the approximately 84 pounds of make-up oil added. The average weight of cooking oil used to fry 100 pounds of French fries was calculated to be 9.50 pounds.

In comparing the results of Example I and Example II the average amount of cooking oil used to fry 100 pounds of frozen French fries in accordance with the invention was lowered from about 15.33 pounds to about 9.50 pounds. This provided a reduction of 5.80 pounds of oil per 100 pounds of frozen French fries cooked, for a very substantial at least 38% reduction in oil usage. In a quick-service restaurant, cooking 100 pounds of frozen French fries per day, over an annual period, the inventive method of Example II would use approximately 3,467 pounds of cooking oil. The conventional cooking method of Example I, on the other hand, would annually use approximately 5,595 pounds of oil to cook a like amount of French fries. This represents a projected annual reduction of cooking oil usage of at least about 2,128 pounds or at least about 38%.

In the Examples shown above, the period between required oil changes was extended from 6 days for a conventional cooking method to 12 days by cooking in accordance with the present invention. On an annual basis, this would reduce the number of necessary oil changes by 30, providing a further benefit of substantially reduced labor costs associated with conducting oil changes. In addition to reduced labor and oil costs, the present invention lessens impact on the environment. Not only is less oil used and less degraded oil discarded, but a corresponding reduction in oil container packaging is achieved. This results in less waste in the form of discarded jugs and cardboard packaging from the jug-in-box containers.

It is believed that a major factor in increasing the length of service between required oil changes is due to the increased oil turnover rate provided by the optimized cooking oil method used in Example II, which daily was 23.33% vs. the daily turnover rate of 14% achieved by the conventional cooking method of Example I. It is noted again that the term 100% turnover as used herein, refers to accomplishing the addition of make-up oil, to compensate for oil uptake, in an amount that equals 100% the amount of the predetermined nominal amount of cooking oil 64 initially placed in vat 14. When accomplishing a 100% oil turnover, the exact amount of the original nominal oil in vat 14 at the beginning of the period that remains after the 100% turnover is somewhat variable as it depends on various factors including how the make-up oil is added and whether there is complete mixing. For example, if replacement oil was added in sixty additions of 0.5 pounds each, the amount of original oil remaining in the vat would be about $(29.5/30)^{60}$ or about 36%. Nevertheless, an increased turnover rate results in cooking oil 64 remaining in vat 14 for a relatively shorter period of time prior to being absorbed as uptake oil and removed from vat 14 than for a lower turnover rate.

Thus, with the increased turnover rate achieved with the method of the present invention, cooking oil generally remains in vat 14 for a shorter period of time. It is also true that a smaller percentage of cooking oil 64 remains in vat 14 for the extended periods of time that causes substantial degradation of such oil. Stated another way, the increased oil turnover rate of the present invention reduces the average age of the vat oil compared to that of conventional cooking. Thus, when compared to conventional cooking methods, the method of the present invention provides vat oil having a higher percentage of relatively recently added replacement oil and a smaller percentage of relatively aged oil, including a smaller percentage of substantially aged and degraded oil.

Because of this, the time of operation between necessary oil changes when practicing the invention can be extended, for as long as 12 days to 17 days between oil changes, depending on the type of food cooked, the throughput of cooked food product, and other cooking conditions. For example, a period of about 112 hours of operation, such as 8 hours of daily operation over about 14 days, to cook about 1750 pounds or greater of food product, can be achieved by the optimized oil usage method of the present invention before an oil change typically should be made. It is noted that the optimized oil usage method of the present invention is especially advantageous for high volume cooking operations, such as those having a throughput per vat of precooked food product of 50 pounds or greater. In high volume cooking, the time to achieve one turnover takes place relatively quickly, such as for example in the range of about 16-60 hours of operation. For example, when cooking with vat oil in the nominal amount of about 30 pounds and cooking 1.5 pound batches of frozen French fries providing an oil uptake of approximately 7% by weight of the frozen French fries, by cooking at average rates of approximately 17.9, 11.9, 8.2, or 4.8 batches per hour, one turnover can be achieved in 16 hours, 24 hours, 35 hours or 60 hours of operation, respectively.

It is noted that the oil filtering method, low average flow rate oil replacement method, and optimized oil usage method of the present invention can all be simultaneously utilized for cooking food product. However, advantages may also be attained by practicing one such method independently of one or both of the other methods of the present invention.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A commercial method of frying discrete batches of food comprising:
    extending a life of cooking vat oil, wherein batches are successively cooked during a period of time required to achieve an oil turnover and for an extended period of time thereafter without changing the oil and without sacrificing quality of the cooked products;
    providing a fry vat containing an amount of cooking oil;
    separately and sequentially cooking, in the cooking oil one or more discrete batches of uncooked food at a time, the weight of the amount of food in each discrete batch on a weight basis relative to the weight of the amount of cooking oil being in the range of from about 0.0375 to about 0.1, wherein the weight of the total amount of food being cooked in the fry vat at any time relative to the weight of the amount of oil in the fry vat being less than or equal to about 0.1, where the food being cooked in the batches is uptaking oil in an amount of from about 5.5% to about 13% by weight of the uncooked food at an oil turnover ratio of the amount of oil uptake by the food in each discrete batch to the amount of oil in the fry vat on a weight basis being in the range of from about 0.0026 to about 0.007 per discrete batch;
    removing each discrete batch from the fry vat after cooking;
    adding replacement oil to the fry vat to replace the uptake oil of the food;
    sequentially cooking a sufficient number of the batches until the oil turnover is equal to the amount of oil in the vat in a period of less than about 60 hours of operation of the fry vat.

2. The method of claim 1 wherein the discrete batch size on a weight basis relative to the weight of the amount of cooking oil is about 0.05 and the oil temperature is from about 320 degrees F. to about 335 degrees F.

3. The method of claim 1 wherein the food is French fries and the uptake of oil by the food is about 7% by weight of the uncooked food.

4. The method of claim 1 wherein the oil turnover ratio on a weight basis is about 0.0035 per discrete batch.

5. The method of claim 1 wherein the oil turnover time is about 35 hours or less of operation of the fry vat.

6. The method of claim 1 wherein the oil turnover time is about 24 hours or less of operation of the fry vat.

7. The method of claim 1 wherein the oil turnover time is about 16 hours or less of operation of the fry vat.

8. The method of claim 1 further comprising replacing the oil after at least 112 hours of operation of the fry vat.

9. The method of claim 1 wherein the food cooked is French fries and the amount of oil consumed per pound of food cooked including make-up oil and replacement oil is about 0.087 pounds of oil per pound of French fries cooked.

10. The method of claim 1 wherein the food cooked is French fries.

11. The method of claim 1 further comprising
electronically monitoring the number of batches cooked since the last filtration and elapsed time of operation since the last filtration;
using an electronic controller to determine when to filter the oil based on a function of the batches of food cooked and the elapsed time in accordance with the equation F=b+kt, where F is the minimum threshold value for requiring filtration, b is the number of batches cooked since the last filtration, k is a constant and t is the amount of time the fry device is in operation since the last filtration; and
filtering the oil in the vat after the batch of food or time of operation that causes the threshold value F is reached or exceeded.

12. The method of claim 1 wherein the replacement oil is added to the fry vat at an average flow rate of about 0.008 gallons to about 0.08 gallons per minute per gallon of oil in the fry vat.

13. The method of claim 1 wherein the food cooked is French fries and the amount of oil consumed per pound of food cooked including make-up oil and replacement oil is about 0.087 pounds of oil per pound of French fries cooked to about 0.1 pounds of oil per pound of French fries cooked.

14. The method of claim 1 further comprising periodically filtering the oil in the fry vat and returning the filtered oil to the fry vat.

15. The method of claim 14 wherein the filtering occurs promptly after frying food in the fry oil wherein the ratio of the amount of food fried since the last filtration to the amount of oil in the fry vat is about 0.7 on a weight basis.

16. The method of claim 14 wherein the filtering occurs promptly after frying food in the fry oil wherein the ratio of the amount of food fried since the last filtration to the amount of oil in the fry vat is about 0.4 on a weight basis.

17. The method of claim 14 wherein the filtering occurs promptly after frying food in the fry oil wherein the ratio of the amount of food fried since the last filtration to the amount of oil in the fry vat is about 0.33 on a weight basis.

18. A commercial method of frying discrete batches of food comprising:
extending a life of cooking vat oil, wherein batches are successively cooked during a period of time required to achieve an oil turnover and for an extended period of time thereafter without changing the oil and without sacrificing quality of the cooked products;
providing a fry vat containing an amount of cooking oil;
separately and sequentially cooking, in the cooking oil one or more discrete batches of uncooked food at a time, the weight of the amount of food in each discrete batch on a weight basis relative to the weight of the amount of cooking oil being in the range of from about 0.0375 to about 0.1, wherein the weight of the total amount of food being cooked in the fry vat at any time relative to the weight of the amount of oil in the fry vat being less than or equal to about 0.1, where the food being cooked in the batches is uptaking oil in an amount of from about 5.5% to about 13% by weight of the uncooked food at an oil turnover ratio of the amount of oil uptake by the food in each discrete batch to the amount of oil in the fry vat on a weight basis being in the range of from about 0.0026 to about 0.007 per discrete batch;
removing each discrete batch from the fry vat after cooking; and
sequentially cooking a sufficient number of the batches until the oil turnover is equal to the amount of oil in the vat in a period of less than about 60 hours of operation of the fry vat.

19. The method of claim 18 wherein the filtering occurs promptly after frying food in the fry oil wherein the ratio of the amount of food fried since the last filtration to the amount of oil in the fry vat is about 0.7 or less on a weight basis, and the oil temperature is from about 320 degrees F. to about 335 degrees F.

20. The method of claim 18 wherein the filtering occurs promptly after frying food in the fry oil wherein the ratio of the amount of food fried since the last filtration to the amount of oil in the fry vat is about 0.4 on a weight basis.

21. The method of claim 18 wherein the filtering occurs promptly after frying food in the fry oil wherein the ratio of the amount of food fried since the last filtration to the amount of oil in the fry vat is about 0.33 on a weight basis.

22. The method of claim 19 further comprising periodically adding replacement oil to the fry vat to replace the uptake oil of the food.

23. The method of claim 19 wherein the filtering occurs promptly after frying food in the fry oil when the ratio of the amount of food fried since the last filtration to the amount of oil in the fry vat is about 0.33 on a weight basis.

24. The method of claim 11 wherein F is 10, k is about 1 and t is the number of time intervals the fry device has been in operation since the last filtration having an interval length of about 6 minutes.

25. A commercial method of frying discrete batches of food comprising:
extending a life of cooking vat oil, wherein batches are successively cooked during a period of time required to achieve an oil turnover and for an extended period of time thereafter without changing the oil and without sacrificing quality of the cooked products;
providing a fry vat containing an amount of cooking oil;
separately and sequentially cooking, in the cooking oil one or more discrete batches of uncooked food at a time, the weight of the amount of food in each discrete batch on a weight basis relative to the weight of the amount of cooking oil being in the range of from about 0.0375 to about 0.1, wherein the weight of the total amount of food being cooked in the fry vat at any time relative to the weight of the amount of oil in the fry vat being less than or equal to about 0.1, where the food being cooked in the batches is uptaking oil in an amount of from about 5.5% to about 13% by weight of the uncooked food at an oil turnover ratio of the amount of oil uptake by the food in each discrete batch to the amount of oil in the fry vat on a weight basis being in the range of from about 0.0026 to about 0.007 per discrete batch;

removing each discrete batch from the fry vat after cooking;

adding replacement oil to the fry vat to replace the uptake oil of the food;

sequentially cooking the batches until the oil turnover is equal to the amount of oil in the vat in a period of less than about 60 hours of operation of the fry vat, further comprising:

electronically monitoring the number of batches cooked since the last filtration and elapsed time of operation since the last filtration;

using an electronic controller to determine when to filter the oil based on a function of the batches of food cooked and the elapsed time in accordance with the equation $F=b+kt$, where F is the minimum threshold value for requiring filtration, b is the number of batches cooked since the last filtration, k is a constant and t is the amount of time the fry device is in operation since the last filtration; and filtering the oil in the vat after the batch of food or time of operation that causes the threshold value F is reached or exceeded.

* * * * *